(No Model.)
J. C. FERREE.
COMBINED MARKER, HARROW, SEEDER, AND ROLLER.
No. 261,327. Patented July 18, 1882.
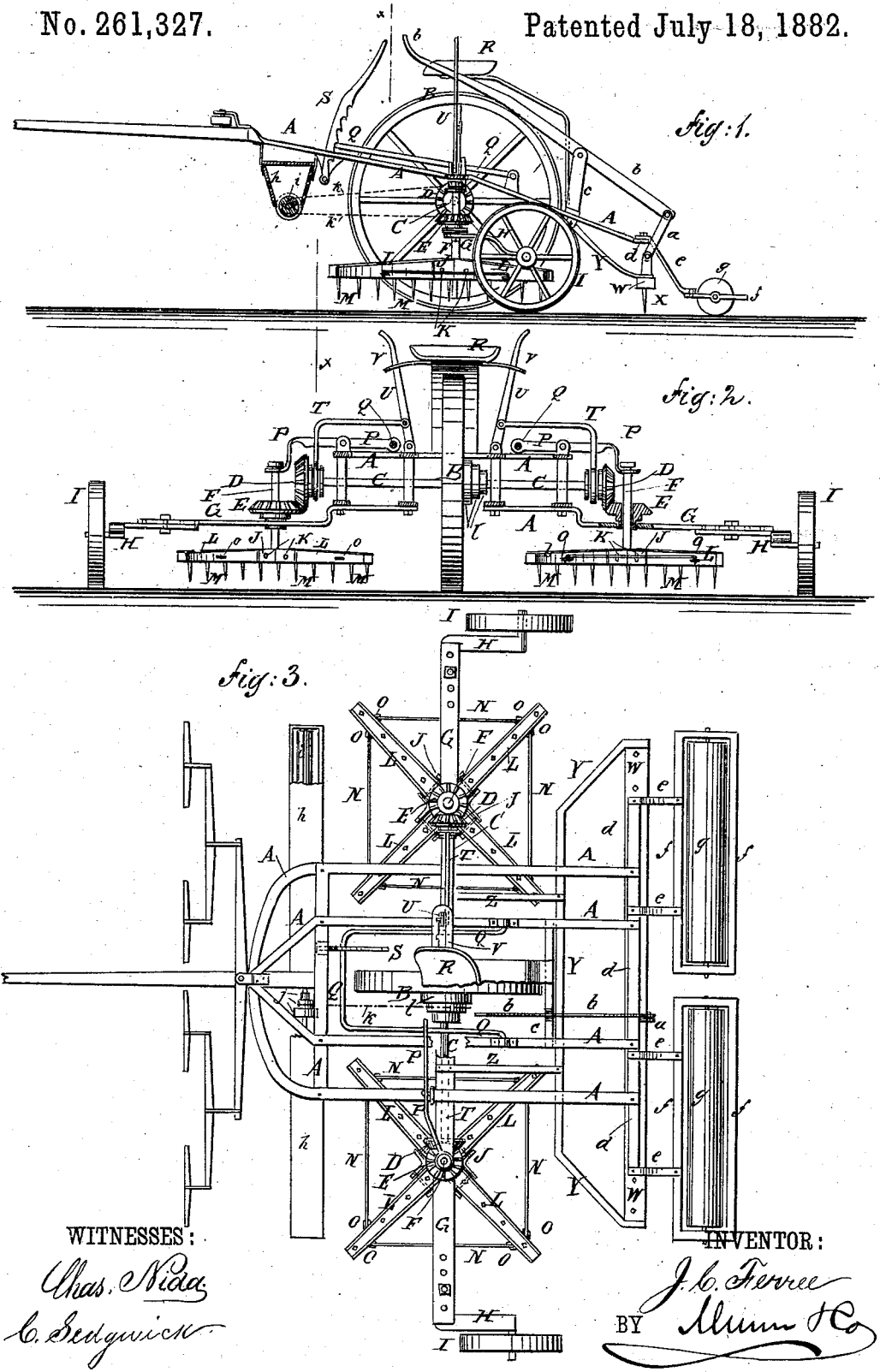

UNITED STATES PATENT OFFICE.

JOHN C. FERREE, OF MARYSVILLE, IOWA.

COMBINED MARKER, HARROW, SEEDER, AND ROLLER.

SPECIFICATION forming part of Letters Patent No. 261,327, dated July 18, 1882.

Application filed November 25, 1881. (No model.)

*To all whom it may concern:*

Be it known that I, JOHN C. FERREE, of Marysville, in the county of Marion and State of Iowa, have invented certain new and useful Improvements in a Combined Marker, Harrow, Seeder, and Roller, of which the following is a full, clear, and exact description.

Reference is to be had to the accompanying drawings, forming part of this specification, in which similar letters of reference indicate corresponding parts in all the figures.

Figure 1 is a side elevation of my improvement. Fig. 2 is a sectional front elevation of the same, taken through the broken line $x\,x$, Fig. 1. Fig. 3 is a plan view of the same, parts being broken away.

The object of this invention is to save farmers from the expense of having to procure separate machines for marking the ground, harrowing the ground, sowing the seed, harrowing in the seed, and rolling the ground.

A represents the frame of the machine, the middle part of which is arched to form a space to receive the large drive-wheel B. The drive-wheel B serves also as a marking-wheel, and is attached to the center of the shaft C, which revolves in bearings attached to the frame A, and to its ends are loosely attached, by spline or tongue-and-groove connections, beveled-gear wheels D. The teeth of the beveled-gear wheels D mesh into the teeth of the beveled-gear wheels E, placed upon the vertical shafts F, and connected with said shafts by tongues and grooves, or other suitable means that will allow the said shafts to slide up and down through the wheels E while being carried with the said gear-wheels in their revolution. The gear-wheels E are swiveled to the bars G, attached to the frame A.

To the outer ends of the bars G are attached crank-axles H, upon the spindles of which revolve the outer wheels, I. The wheels I serve as the side marking-wheels. Several holes are formed in the outer ends of the bars G to receive the bolts that secure the crank-axles H to the said bars, so that the side marking-wheels, I, can be adjusted at a greater or less distance from the center marking-wheel, B, as the desired distance apart of the rows may require.

To the lower ends of the vertical shafts F are attached four armed socket-plates or couplings, J, the upper sides of the sockets of which are left open. In the sockets of the couplings J are hinged by bolts K the inner ends of the radial bars L, so that the said bars L can be turned up into or toward a vertical position when not required for use.

To the hinged radial bars L are attached harrow-teeth M. The radial bars are connected near their outer ends by brace-rods N, the ends of which are bent into hook form, and are hooked into staples O, attached to the sides of the said radial bars L. The brace-rods N are detached when the hinged radial bars L are to be swung up into an upright position, and the same rods N can then be used for holding the said bars L in a raised position.

The upper ends of the vertical shafts F are swiveled to the outer ends of the levers P, which are fulcrumed to supports attached to the frame A. The inner ends of the levers P are pivoted to the arms of a U-shaped lever, Q, the ends of which are pivoted to the frame A upon the opposite sides of the rear part of the center wheel, B. The bow of the lever Q is in front of the center wheel, B, and in such a position that it can be readily reached and operated by the driver with his feet while sitting upon the driver's seat R. With this construction, by pressing the forward part or bow of the lever Q downward the rotary harrows J L can be raised more or less, as may be required, without affecting the rotary movement of the said harrows. The lever Q is held in any position into which it may be adjusted by a serrated catch-lever, S, the teeth of which engage with the bend or bow of the said lever Q. The lower end of the catch-lever S is pivoted to a cross-bar of the frame A, and its upper end projects into such a position that it can be conveniently reached and operated by the driver from his seat R.

The hubs of the gear-wheels D revolve in bearings in the ends of the connecting-bars T, which project upward, are bent inward, and their inner ends are pivoted to the levers U at a little distance from the lower ends of the said levers U. The lower ends of the levers U are pivoted to the frame A upon the opposite sides of the wheel B, and their upper ends project into such positions that they can be readily reached and operated by the driver from his seat R. With this construction the gear-wheels D can be slid upon the shaft C and thrown into and out of gear with the gear-wheels E by operating the levers U. The levers U are held in any position into which they may be adjusted by catch-bars V, attached to the arched bar or standard that supports the driver's seat R, or to the said driver's seat R.

W is a long cross-bar, to which are attached harrow-teeth X. Y is a bail or frame, the ends of which are attached to the ends of the said bar W, and its middle part is attached to the rear ends of the bars Z, the forward ends of which are coupled or otherwise hinged to the frame A or shaft C. The harrow W X is designed to level, smooth off, and give a second harrowing to the ground.

To the middle part of the harrow-bar W, or to a support attached to the said bar, is hinged the lower end of a short connecting-bar, a, the upper end of which is hinged to the rear end of the lever b. The lever b is fulcrumed to a standard, c, attached to the frame A, and its forward end projects into such a position that it can be conveniently reached and operated by the driver to raise the harrow W X from the ground.

To the projecting rear ends of the longitudinal bars of the frame A is attached a cross-bar, d, to which are hinged by couplings or other suitable means the ends of short connecting-bars e. The other ends of the hinged connecting-bars e are attached to the forward bars of the frames f, to the end bars of which are pivoted the journals of the rollers g. The rollers g are designed to roll in the seed and level and smooth the ground.

To the forward part of the frame A are attached two or more seed-boxes, h, which are placed end to end, and within them are pivoted the seed-dropping cylinders i. The cylinders i are grooved longitudinally to receive the seed and carry it to the discharge-openings in the bottom of the seed-boxes h, through which it falls to the ground.

To the shaft of the seed-dropping cylinders i, between the inner ends of the seed-boxes h, is attached a cone-pulley, j, around which passes a belt, k. The belt k also passes around a cone-pulley, l, attached to the shaft C at the side of the drive-wheel B, so that the said seed-dropping cylinders will be driven from the said shaft C. The cone-pulleys j l allow the seed-dropping cylinders i to be revolved faster or slower, according as more or less seed is required to be sown.

Having thus fully described my invention, I claim as new and desire to secure by Letters Patent—

1. The combination, with the harrow-shaft F, of gear D E, shaft C, supported on wheel B, the axle-bars G H, supported on wheels I, and the levers P Q, as shown and described.

2. The combination, with the shaft F, of the socketed couplings J, the radial bars L, hinged in said sockets, carrying teeth M, and having hooks O, the detachable hooked brace-rods N, the bars T, and the levers U, as and for the purpose specified.

JOHN CALVIN FERREE.

Witnesses:
JOHN METZ,
H. S. KNIGHT.